United States Patent
Daniel (10) Patent No.: US 8,621,130 B2
(45) Date of Patent: Dec. 31, 2013

(54) SYSTEM DATA TRANSFER OPTIMIZATION OF EXTENDED COMPUTER SYSTEMS

(76) Inventor: David A. Daniel, Scottsdale, AZ (US)

( * ) Notice: Subject to any disclaimer, the term of this patent is extended or adjusted under 35 U.S.C. 154(b) by 314 days.

(21) Appl. No.: 12/587,782

(22) Filed: Oct. 13, 2009

(65) Prior Publication Data

US 2010/0106882 A1  Apr. 29, 2010

Related U.S. Application Data

(60) Provisional application No. 61/195,863, filed on Oct. 10, 2008.

(51) Int. Cl.
*G06F 13/20* (2006.01)

(52) U.S. Cl.
USPC .............................. 710/313; 710/315; 713/1

(58) Field of Classification Search
USPC ....................... 710/313, 305–306, 315; 713/1
See application file for complete search history.

(56) References Cited

U.S. PATENT DOCUMENTS

| | | | | |
|---|---|---|---|---|
| 7,620,516 | B2 * | 11/2009 | Rozenboim et al. | 702/125 |
| 2008/0195756 | A1 * | 8/2008 | Galles | 709/245 |
| 2009/0006710 | A1 * | 1/2009 | Daniel et al. | 710/315 |
| 2009/0077297 | A1 * | 3/2009 | Zhao et al. | 710/314 |
| 2009/0276551 | A1 * | 11/2009 | Brown et al. | 710/72 |

* cited by examiner

*Primary Examiner* — Ryan Stiglic
*Assistant Examiner* — Kim Huynh
(74) *Attorney, Agent, or Firm* — Robert C. Klinger (57) ABSTRACT

A solution for setup and optimization of a data transfer path in extended computer systems, where the I/O system is virtualized. The solution achieves advantageous results via a mechanism that automates the configuration of multiple data path components. The solution achieves initial optimization and then automates continual optimization of the data path through monitoring of changes and through dynamic adjustment of system resources and data transfer characteristics.

16 Claims, 7 Drawing Sheets

| Phase | System Data Transfer Utility | RCR/M | System Data Transfer Driver | TLO |
|---|---|---|---|---|
| Initial Boot Disk Setup | Intialize and display GUI<br><br>Accept User Input<br><br>Scan Extended System<br><br>Configure all Data path components<br><br>Store Configuration to HBA RCR/M<br><br>Not Executing | → Default Entries<br><br><br><br><br><br><br><br>→ Extended System Configuration Entries | Not Executing | Not Executing |
| Reboot | | | Executes | |
| Host System Initialization & Enumeration | | | Read RCR/M And Configure Extended System Per Entries | |
| Normal Operation | | Optimized System Configuration Entries ← | Not Executing | Executes<br><br>track data transfers<br>↓<br>Store transfer characteristics<br>↓<br>Make Adjustments to RCR/M |

SYSTEM DATA TRANSFER OPTIMIZATION OF EXTENDED COMPUTER SYSTEMS

CLAIM OF PRIORITY

This application claims priority of U.S. Provisional Patent Application Ser. No. 61/195,863 entitled "SYSTEM DATA TRANSFER OPTIMIZATION OF EXTENDED COMPUTER SYSTEMS" filed Oct. 10, 2008, the teachings of which are incorporated herein by reference.

FIELD OF THE INVENTION

The present invention relates to extension of a computer's native system bus via high speed data networking protocols and techniques for optimizing data transfer in such a system, including virtualization of the computer system.

BACKGROUND OF THE INVENTION

There is growing acceptance of techniques that leverage networked connectivity for extending and centralizing the resources of host computer systems. In particular, networked connectivity is being widely utilized for specialized applications such as attaching storage to computers. iSCSI makes use of TCP/IP as a transport for the SCSI parallel bus to enable low cost remote centralization of storage. The problem with iSCSI is it has a relatively narrow (storage) focus and capability.

Another trend is the move towards definition and virtualization of multiple computing machines within one host system. Virtualization is particularly well suited for blade server installations where the architecture is optimized for high density compute resources and pooled storage. The virtualization of CPU cycles, memory resources, storage, and network bandwidth allows for unprecedented mobility, flexibility, and adaptability of computing tasks.

PCI Express, as the successor to PCI bus, has moved to the forefront as the predominant local host bus for computer system motherboard architectures. A cabled version of PCI Express allows for high performance directly attached bus expansion via docks or expansion chassis. These docks and expansion chassis may be populated with any of the myriad of widely available PCI Express or PCI/PCI-X bus adapter cards. The adapter cards may be storage oriented (i.e. Fibre Channel, SCSI), video processing, audio processing, or any number of application specific Input/Output (I/O) functions. A limitation of PCI Express is that it is limited to direct attach expansion. A problem with certain blade server architectures is PCI Express is not easily accessible, thus expansion is awkward, difficult, or costly.

Gbps Ethernet is beginning to give way to 10 Gbps Ethernet. This significant increase in bandwidth enables unprecedented high performance applications via networks.

A hardware/software system and method that collectively enables virtualization of the host bus computer's native I/O system architecture via the Internet, LANs, WANs, and WPANs is disclosed in U.S. patent application Ser. No. 12/148,712, the teachings of which are incorporated herein by reference. The system described, designated "i-PCI", achieves technical advantages as a hardware/software system and method that collectively enables virtualization of the host computer's native I/O system architecture via the Internet, LANs, WANs, and WPANs. The system includes a solution to the problems of the relatively narrow focus of iSCSI, the direct connect limitation of PCI Express, and the inaccessibility of PCI Express for expansion in blade architectures.

Figure 1:
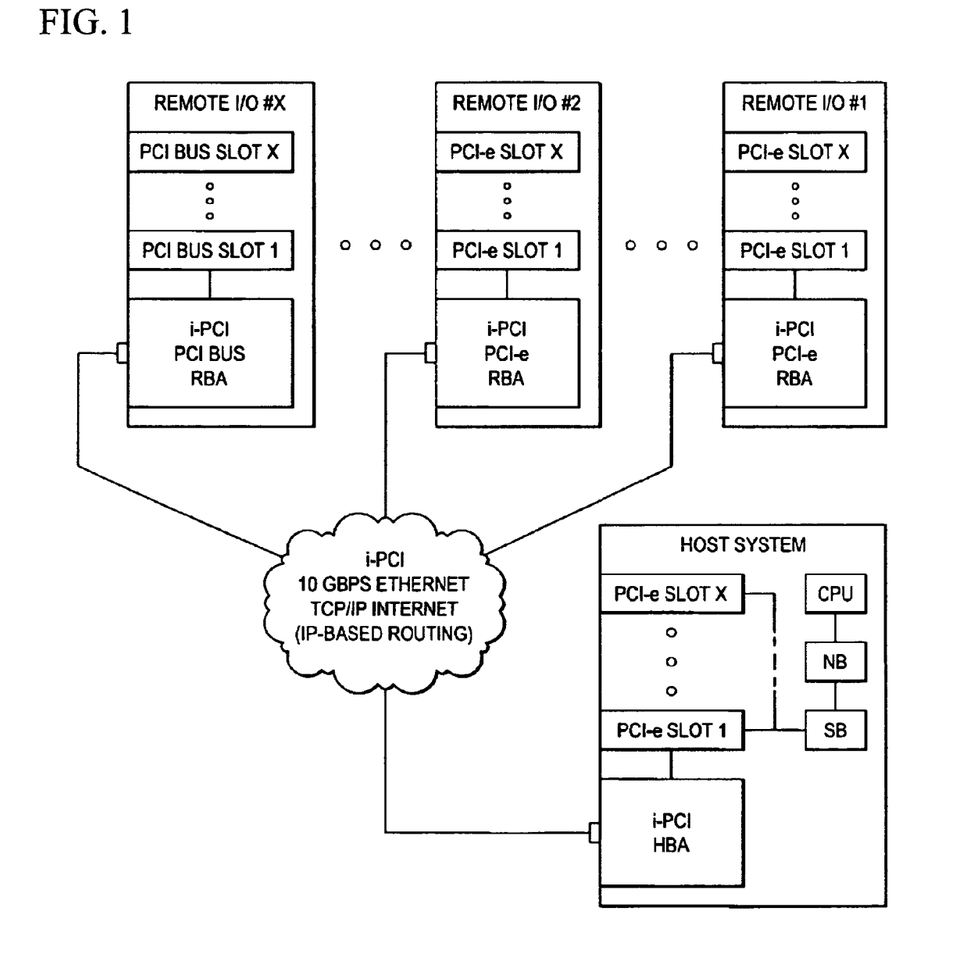
FIG. 1 depicts using the Internet as a means for extending a computer system's native bus via high speed networking.

Referring to FIG. 1, this system allows devices native to the host computer native I/O system architecture—including bridges, I/O controllers, and a large variety of general purpose and specialty I/O cards—to be located remotely from the host computer, yet appear to the host system and host system software as native system memory or I/O address mapped resources. The end result is a host computer system with unprecedented reach and flexibility through utilization of LANs, WANs, WPAN as and the Internet.

A drawback to this type of extended system is it introduces unprecedented complexity in the native system "data path". The data path in this context refers to the collective aggregation of links, bridges, switches, controllers, buffers, etc.—essentially the entire transit route of a data object from the data generating application to the data consuming endpoint device.

Figure 2:
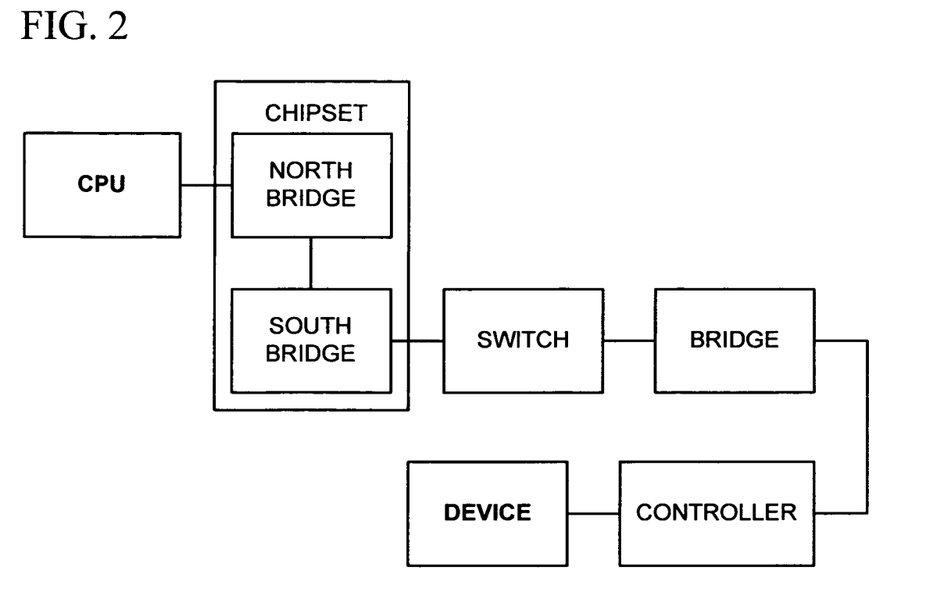
FIG. 2 depicts the native system data transfer path of a typical non-extended computer system.
Figure 3:
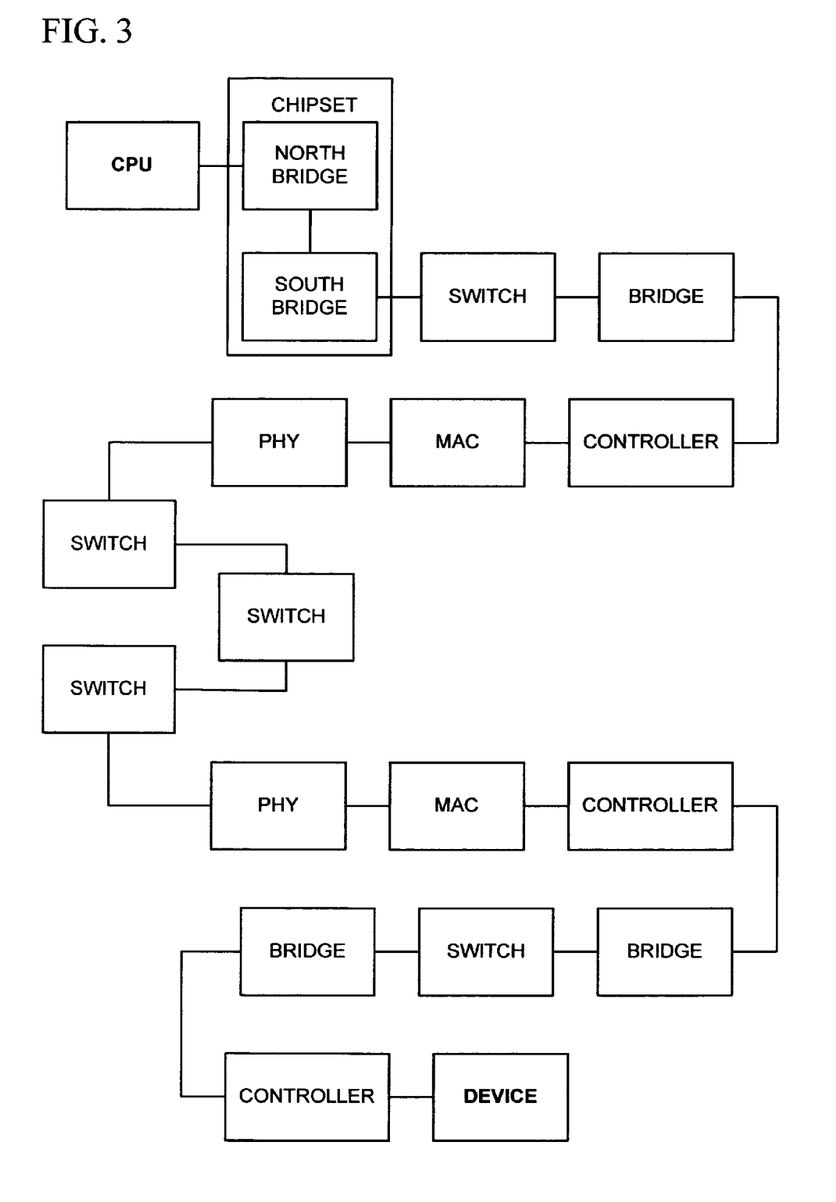
FIG. 3 depicts the native system data transfer path of a typical extended computer system.

In an extended system the large number of resource configuration options and data path packetization options can lead to bottlenecks in the data transfer path if the path is not considered as a whole and then optimized at multiple levels for maximum data transfer performance. FIG. 2 shows the native system data transfer path of non-extended computer system. FIG. 3 shows the much greater complexity of the native system data transfer path of an extended computer system as a comparison.

Existing approaches are inadequate for extended systems, where a host computer's native system bus has been extended via high speed data networking protocols. Existing approaches involve simple link-by-link, component-by-component configuration, with configurations typically left to default settings. Existing approaches do not address optimization of the data path considered in its entirety. Data path optimization—if it is in fact attempted at all—is typically accomplished by the user via manual trial and error through writing various values to data path component configuration registers. In actual applications, a user must consider more than just the individual components and data links. The data transfer rate through any one link is influenced to some degree by each of the other links in the data path chain. Essentially, no two system data transfer chains are exactly the same. Thus, there can be a wide variation from system to system.

Performance through a given data path may be influenced by the interaction between the chipset-specific implementation of PCI/PCI Express data transfer commands; motherboard architecture; FIFO depth of bridges, controllers, and peripherals; data traffic patterns generated by a given combination of peripherals; peripheral-specific response to data transfer commands; the ability of bridges, controllers and peripherals to support burst commands and maximum and minimum supported packet sizes; the degree of standards compliancy of each data path component, and finally, the data traffic patterns generated by host software applications themselves. Unless the user is extremely computer literate and able to grasp all the complexities of a dynamic data path, the likelihood of achieving optimal performance is small. This problem is magnified in extended systems involving virtualized I/O.

SUMMARY OF THE INVENTION

The present invention achieves technical advantages through optimizing a data path via a module that automates the configuration of multiple data path components.

One aspect of the invention is a software driven optimization of an extended computer system for data performance. Extended computer systems occur when I/O virtualization techniques are implemented, such as with i-PCI.

One aspect of this invention is a system and method necessary to optimize the configuration of a host computer where the native system bus has been extended via virtualization. In this type of extended system, hardware devices (in particular I/O devices) native to the host architecture—including bridges, I/O controllers, and a virtually endless variety of general purpose and specialty I/O cards—may be located far afield from the host computer, yet appear to the host system and host system software as native system memory or I/O address mapped resources. The end result is a host computer system with unprecedented reach and flexibility.

The invention achieves optimization via initial setup, and then automates continual optimization of the data path and maintains and actually improves performance through monitoring of changes and dynamic adjustment of system resources and data transfer characteristics over time. The net result is optimization of a complex data path that would otherwise not be possible through existing approaches.

DETAILED DESCRIPTION OF THE PRESENT INVENTION

The invention is a solution for setup and optimization of a data transfer path in extended computer systems, where the I/O system is virtualized.

Figure 4:
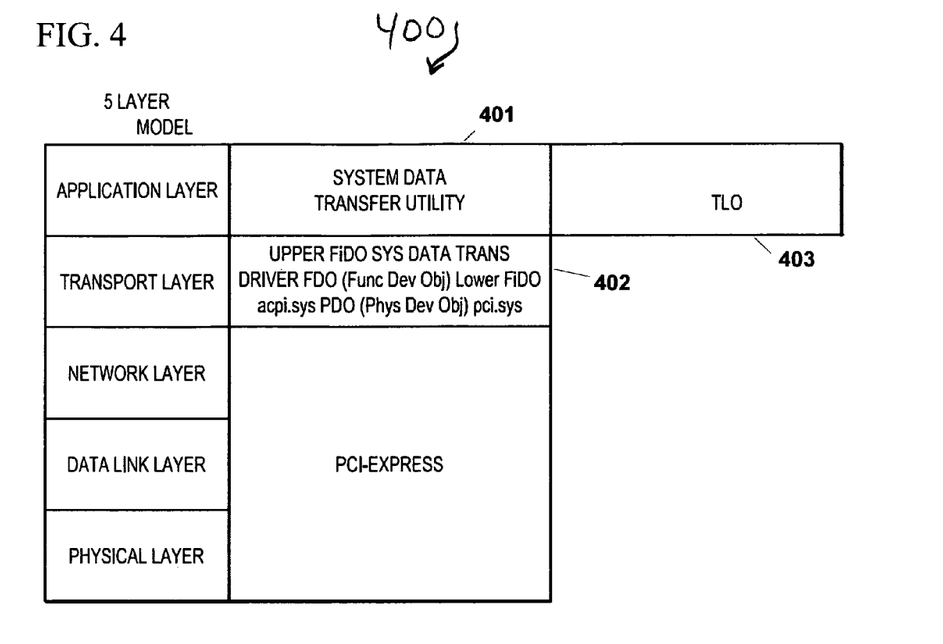
FIG. 4 depicts the software/firmware/logic model for the invention.

Referring to FIG. 4, one preferred embodiment is a multiple component solution for systems where the architecture of a PCI Express based host has been extended via TCP/IP, Ethernet, and industry standards-based interconnected networking infrastructure. A composite software module solution 400 is illustrated within the context of a multi-protocol layer model. The solution consists of:

System Data Transfer Utility 401: The System Data Transfer Optimization Utility is a boot-disk user-launched program that runs following the BIOS scan and configuration of the PCI System. The utility takes user input information regarding the system configuration and optimization goals, scans the system, initializes the Host Bus Adapter (HBA) Remote Device Resource Cache Reflector/Mapper (RCR/M) 502, configures the data path according to a desired performance emphasis, displays the configuration results, and stores the configuration results to the RCR/M.

System Data Transfer Driver 402: This is an Upper Filter Driver Object (FiDO) that can be loaded to run automatically during the host operating system enumeration of the PCI System. During OS initialization, it automatically verifies and adjusts settings according to the RCR/M entries previously defined by the System Data Transfer Optimization Utility.

TLO 403: This is an application that runs native to the HBA. TLO optimizes I/O performance over time by monitoring data transfers and making dynamic adjustment to the RCR/M to tailor the data path to the prevalent data transfer type.

Figure 5:
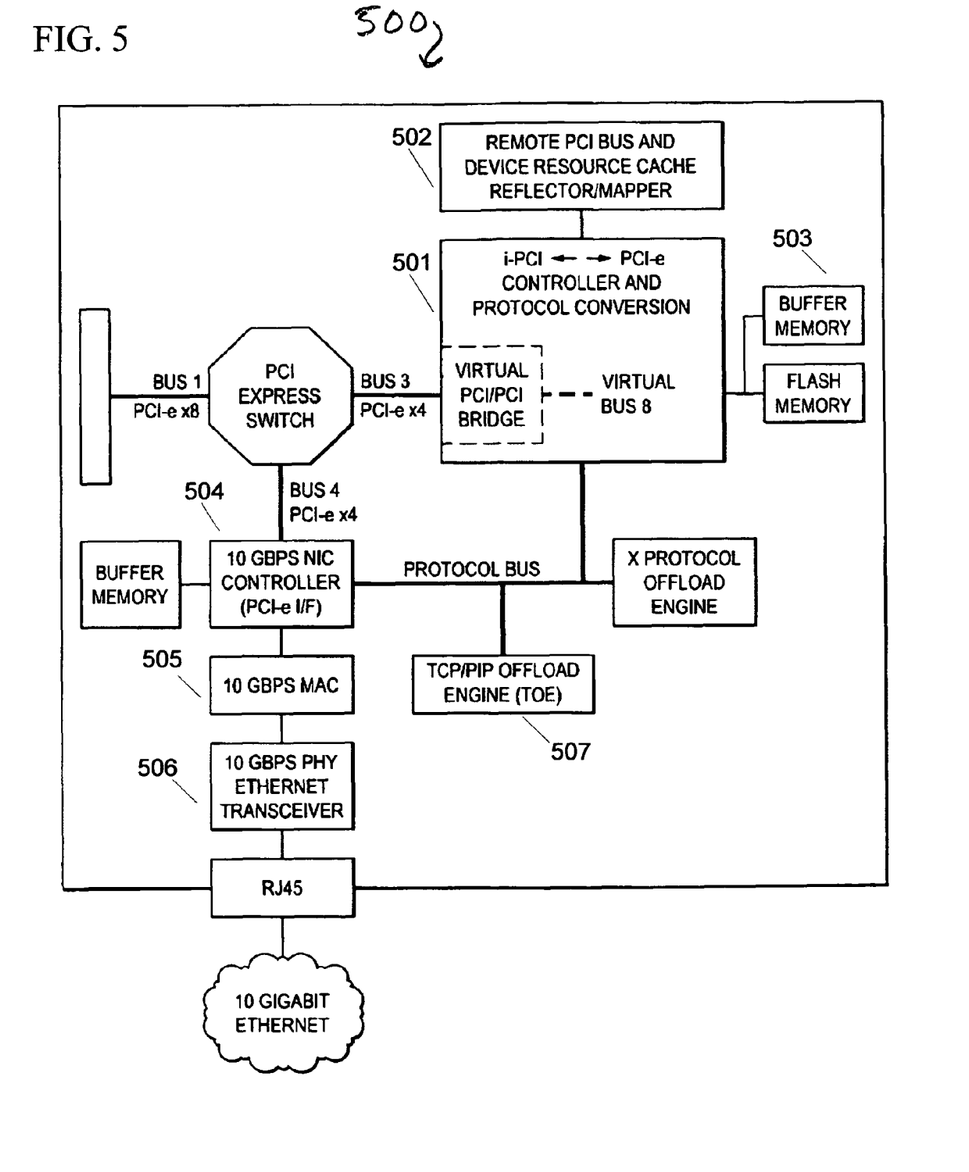
FIG. 5 depicts the Host Bus Adapter (HBA) block diagram, showing the major functional blocks.

In one preferred embodiment, the Host Bus Adapter is in the form of a PCI Express Host Bus Adapter shown at 500. In one preferred embodiment, the HBA design includes a Controller and Protocol Converter 501, memory for implementing a mirror and cache to reflect the remote I/O resources 502, as well as buffers 503, a 10 Gbps NIC Controller 504, MAC 505, PHY 506, and TCP/IP Offload Engine (TOE) 507. Refer to FIG. 5 for a HBA block diagram.

Figure 6:
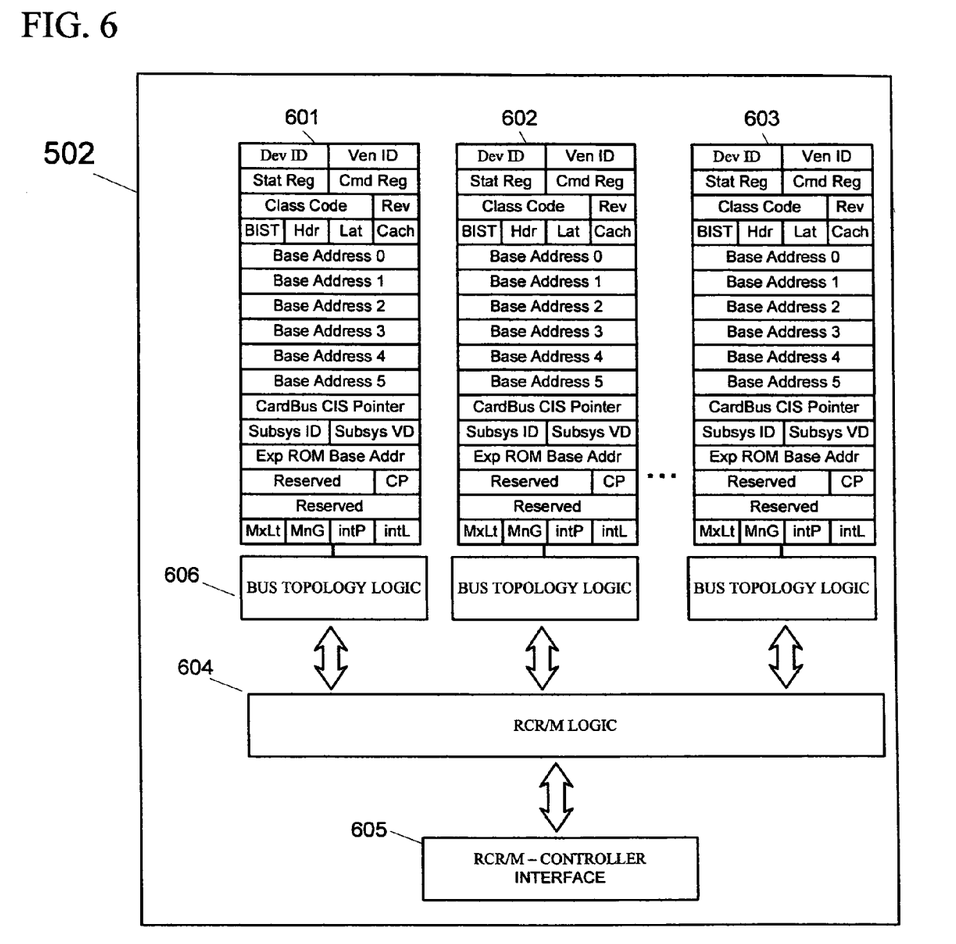
FIG. 6 depicts the Resource Cache Reflector/Mapper (RCR/M)

The HBA mirror and cache is a complete PCI System mirror referred to as the Resource Cache Reflector/Mapper (RCR/M) 502. Referring to FIG. 6, the RCR/M is shown at 600 and is resident in logic and nonvolatile read/write memory on the HBA. The RCR/M 600 consists of an interface 605 to the Controller and Protocol Converter and logic for accessing configuration data structures. The data structures 601, 602, 603 contain entries representing remote PCI bridges and PCI device configuration registers and bus segment topologies 606. These data structures are pre-programmed via a user interactive System Data Transfer Optimization Utility 401. Following a reboot, during enumeration the BIOS "discovers" these entries, interprets these logically as the configuration space associated with actual local devices, and thus assigns the proper resources to the mirror.

As a simple illustrative example of how the TLO may optimize a given data transfer path, consider the following scenario: The TLO is programmed to perform basic performance logging and analysis. A Hard Disk Drive (HDD) and associated HDD adapter card are located in one of the remote I/O, similar as shown in FIG. 1. The TLO logs data traffic over a length of time and stores the data statistics for periodic analysis. TLO performs the periodic analysis and determines that the data traffic it has been logging consists of 80% block writes to the HDD. These block writes achieve on average 100 MB/sec throughput when the block size is 16 B-64 B but it drops to 10 MB/sec when the block size is greater than 64 B. The TLO programming flags this condition as a candidate for optimization since this is the opposite result of the expected. The TLO then examines the RCR/M configuration space for each component associated with the data path to the HDD. It determines that the device control register of one of the bridges in remote I/O is set for 32 B maximum payload size and logically determines this is a likely problem given the greater than 64 B block transfers. TLO then takes action and reprograms the RCR/M configuration space associated with the bridge so that it supports 256 B maximum payload sizes. The RCR/M is commanded by TLO to sync its configuration space with the actual bridge. TLO then resumes logging data traffic over a length of time and stores the data for periodic analysis. TLO determines that the new performance level is 100 MB/sec throughput when the block size is 16 B-64 B and 124 MB/sec when the block size is greater than 64 B. This is now consistent with expected results and the TLO programming clears the optimization candidate flag and the net result is improved performance in the extended system.

Figure 7:
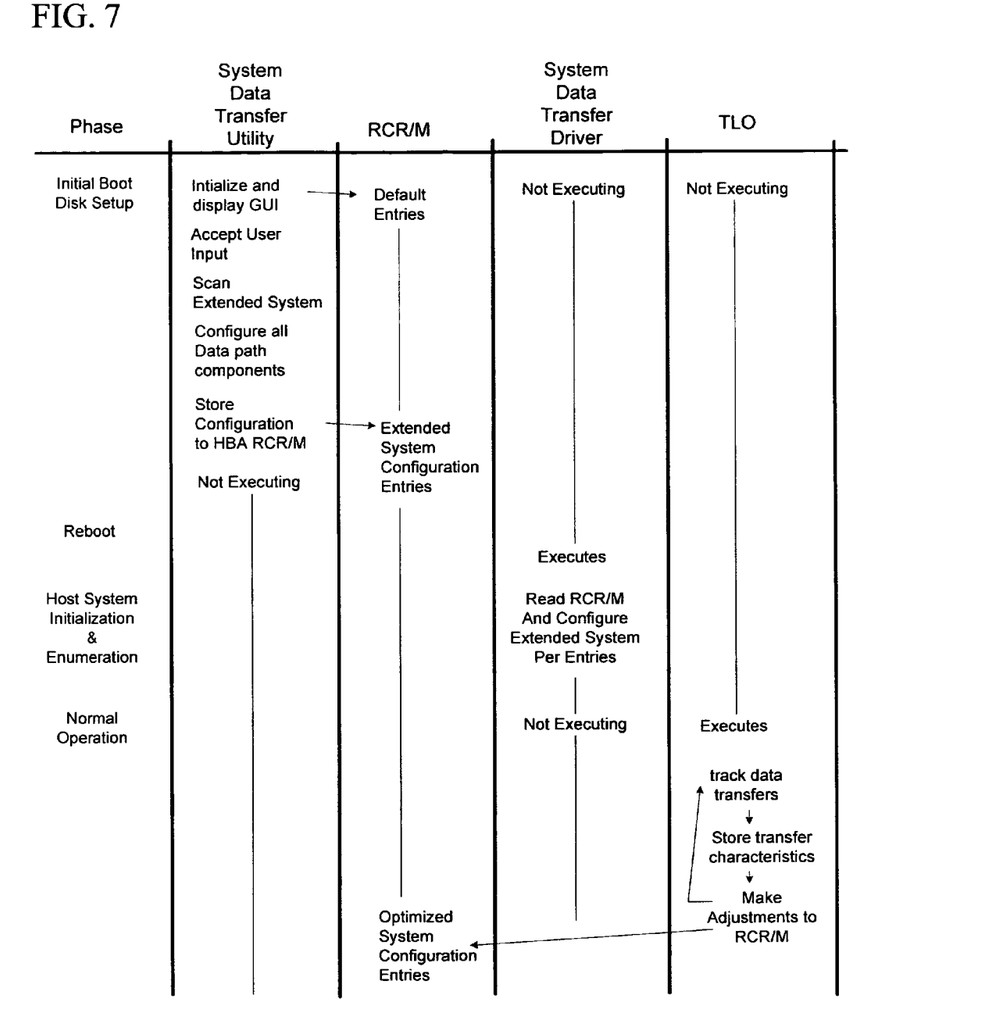
FIG. 7 is an exchange diagram showing the interaction of the invention components.

The collective components, working together, compose one aspect of the invention—a software driven optimization of an extended computer system for data performance. FIG. 7 is an exchange diagram that illustrates how the components work together to form the complete solution.

Though the invention has been described with respect to a specific preferred embodiment, many variations and modifications will become apparent to those skilled in the art upon reading the present application. The intention is therefore that the appended claims be interpreted as broadly as possible in view of the prior art to include all such variations and modifications.

What is claimed is:

1. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, further including a boot-disk user-launched program configured to run following a BIOS scan and configuration of the host computer system.

2. The module as specified in claim 1 wherein the module is configured to automatically configure multiple said data transfer paths for the remote target devices in the extended computer system.

3. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, wherein the module is configured to accept user input information regarding the extended computer system configuration and optimization goals, scan the extended computer system, and initialize the host bus adapter.

4. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, wherein the module is further configured to initialize a remote device resource cache reflector/mapper (RCRJM) associated with a host bus adapter.

5. The module as specified in claim 4 wherein the module is configured to configure the data transfer path according to a desired performance emphasis, display the configuration results, and store the configuration results to the RCRIM.

6. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, further comprising an upper filter driver object (FiDO) configured to be loaded to run automatically during enumeration of the host operating system.

7. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, further comprising an application configured to run native to the host bus adapter and improve I/O performance over time by monitoring data transfers over the data transfer paths and make dynamic adjustment to tailor the data transfer path to a prevalent data transfer type, wherein the application is configured to make the dynamic adjustment to a remote device using a resource cache reflector/mapper (RCRIM).

8. A module configured to setup and improve a data transfer path in an extended computer system, the extended computer system having a host computer and at least one remote target device where an I/O is virtualized, and a data network between the host computer and the at least one remote target device, wherein the extended computer system is PCI or PCI Express based, and virtualization is accomplished via the Internet, LANs, WANs, or WPANs as the data network, wherein the module is configured to perform dynamic adjustment of the data transfer path of the remote target device and improve the data transfer path, further including a composite software module configured to operate in conjunction with a host bus adapter to improve the data transfer path, further including a composite software module configured to operate in conjunction with a host bus adapter to improve the data transfer path, wherein the host bus adapter is a PCI Express host bus adapter, wherein the host bus adapter includes a controller and protocol converter, and a memory configured to implement a mirror and cache to reflect remote I/O resources.

9. The module as specified in claim 8 wherein the host bus adapter further includes buffers, a MC Controller, a MAC, a PRY, and a TCP/IP offload engine.

10. The module as specified in claim 8 wherein the mirror and cache is a complete per System mirror resident in logic and nonvolatile read/write memory on the host bus adapter.

11. The module as specified in claim 10 wherein the mirror and cache comprise an interface to the controller and protocol converter and logic for accessing configuration data structures having entries representing remote PCI bridges and PCI device configuration registers and bus segment topologies.

12. The module as specified in claim 11 wherein the data structures are pre-programmed via a user interactive system data transfer optimization utility.

13. The module as specified in claim 12 wherein the module is configured such that following a reboot of the host computer, during enumeration the BIOS is configured to discover the entries, interprets the entries logically as the configuration space associated with actual local devices, and responsively assign proper resources to the mirror.

14. The module as specified in claim 8 wherein the module is configured such that data traffic over the data transfer path to one said remote target device is analyzed over a length of time to detect data transfer paths that may be improved, and responsively reconfigure a configuration space associated with the remote target device.

15. The module as specified in claim 14 wherein the module is configured to analyze throughput of data to one said remote target device as a function of block size during data transfer, and responsively reconfigure a device control register of the remote target device and improve the throughput of data to the respective remote target device.

16. The module as specified in claim 15 wherein the device control register is in a bridge of the respective remote target device.

\* \* \* \* \*